US005554453A

United States Patent [19]

Steinfeld et al.

[11] Patent Number: 5,554,453

[45] Date of Patent: Sep. 10, 1996

[54] CARBONATE FUEL CELL SYSTEM WITH THERMALLY INTEGRATED GASIFICATION

[75] Inventors: George Steinfeld, Southbury, Conn.; Steven J. Meyers, Huntington Beach, Calif.; Arthur Lee, Fishkill, N.Y.

[73] Assignee: Energy Research Corporation, Danbury, Conn.

[21] Appl. No.: 368,430

[22] Filed: Jan. 4, 1995

[51] Int. Cl.[6] .............................. H01M 8/04; H01M 8/06

[52] U.S. Cl. ................................ 429/17; 429/19; 429/16; 429/20; 429/26

[58] Field of Search ................................ 429/17, 19, 16, 429/20, 26

[56] References Cited

U.S. PATENT DOCUMENTS

| | | | |
|---|---|---|---|
| 3,477,942 | 11/1969 | Cockran | 208/10 |
| 4,041,210 | 8/1977 | Van Dine | 429/16 |
| 4,128,700 | 12/1978 | Sederquist | 429/17 |
| 4,365,006 | 12/1982 | Baker | 429/17 |
| 4,532,192 | 7/1985 | Baker et al. | 429/19 |
| 4,622,275 | 11/1986 | Noguchi et al. | 429/19 |
| 4,738,903 | 4/1988 | Garow et al. | 429/17 |
| 4,791,033 | 12/1988 | Patel | 429/19 |
| 4,828,940 | 5/1989 | Cohen et al. | 429/20 |
| 4,865,926 | 9/1989 | Levy et al. | 429/20 |
| 4,902,586 | 2/1990 | Wertheim | 429/20 |
| 4,921,765 | 5/1990 | Gmeindl et al. | 429/16 |
| 5,084,362 | 1/1992 | Farooque | 429/19 |
| 5,208,114 | 5/1993 | Vematsu et al. | 429/20 |

OTHER PUBLICATIONS

Int. J. Hydrogen Energy, vol. II, No. 3, pp. 161–167, 1986, Great Britain (no month).

United Technologies Corp, "The Study of Intregrated Coal–Gasifier Moltlen Carbonate Fuel Cell Systems" Jet Propulsion Laboratory, Pasadena California, Jul. 10, 1983.

*Primary Examiner*—Stephen Kalafut
*Assistant Examiner*—Carol Chaney
*Attorney, Agent, or Firm*—Robin, Blecker, Daley & Driscoll

[57] ABSTRACT

A fuel cell system employing a gasifier for generating fuel gas for the fuel cell of the fuel cell system and in which heat for the gasifier is derived from the anode exhaust gas of the fuel cell.

44 Claims, 2 Drawing Sheets

CARBONATE FUEL CELL SYSTEM WITH THERMALLY INTEGRATED GASIFICATION

This invention was made with U.S. Government support under contract DE-AC21-90MC27227 awarded by the Department of Energy. The Government has certain rights under this invention.

BACKGROUND OF THE INVENTION

This invention relates to fuel cell systems and, in particular, to fuel cell systems which include gasifiers for generating fuel gas for the systems.

In a conventional high temperature fuel cell system, such as, for example, an internally reforming carbonate fuel cell system, efforts have been made to integrate a coal gasifier with the fuel cell system for generating fuel gas for the fuel cell of the system. In a system of this type, the fuel gas generated by the coal gasification process is primarily in the form of hydrogen, carbon monoxide and carbon dioxide. This fuel gas is fed to the anode compartment of the fuel cell, while the cathode compartment receives oxidant gas or air. In the anode compartment of the fuel cell, internal reforming of any hydrocarbons present in the fuel gas occurs. The reformed fuel gas in the anode compartment and the oxidant gas in the cathode compartment, in the presence of the carbonate electrolyte of the fuel cell, then undergo electrochemical conversion to generate electricity.

In a fuel cell system of the above type, waste heat carried by the exhaust gases from the cathode compartment is used to generate steam in a heat recovery steam generator. The resultant steam is then used in a so-called steam turbine bottoming cycle, where additional power is produced, but at a lower efficiency than in the fuel cell.

The steam generated in the heat recovery system is also supplied to the coal gasifier to provide the steam needed for the gasification process. The latter process when conventionally carried out requires a high temperature for complete conversion of the hydrocarbon coal into a tar-free fuel gas. In order to realize this high temperature, oxidant gas is usually fed to the gasifier to burn a portion of the coal and thereby generate heat.

The high temperature used in the gasification process, results in a fuel gas whose temperature is generally higher than that desired for the equipment which is to process the gas. This requires the gas to be cooled, resulting in efficiency and cost penalties. Similar penalties result from the use in the gasifier of oxidant gas to burn coal to generate heat for the gasification process.

It is therefore an object of the present invention to provide a fuel cell system including a gasifier which attempts to overcome the above disadvantages.

It is a further object of the present invention to provide a fuel cell system including a gasifier in which the need to provide oxidant to the gasifier to generate heat is avoided.

It is yet a further object of the present invention to provide a fuel cell system including a gasifier in which the gasification process is carried out in a manner to promote the overall efficiency of the fuel cell.

SUMMARY OF THE INVENTION

In accordance with the principles of the present invention, the above and other objectives are realized in a fuel cell system of the above type in which a gasifier is employed and in which means is provided for using the exhaust gas of the anode compartment of the fuel cell to generate and transfer heat to the gasifier without admixing the anode exhaust gas with the gases in the gasifier.

In the embodiments of the invention to be disclosed hereinafter, a catalytic burner is used to burn the anode exhaust gas with an oxidant gas to generate the heat for the gasifier. In one embodiment, the catalytic burner is disposed within the gasifier so that the heat generated by the burner is transferred directly into the gasifier. In a second embodiment, a recirculation loop is provided for recirculating the fuel gas from the gasifier, and the catalytic burner transfers heat to the recirculation loop.

In both the embodiments of the invention, the gasifier is operated at a high pressure and at a temperature near the operating temperature of the fuel cell. The catalytic burner, in turn, is operated at a low pressure and high temperature.

In both the embodiments of the invention, the gasifier shown is a catalytic coal gasifier. Also disclosed is the use of a biomass gasifier and other types of gasifiers.

BRIEF DESCRIPTION OF THE DRAWINGS

The above and other features and aspects of the present invention will become more apparent upon reading the following detailed description in conjunction with accompanying drawings, in which.

DETAILED DESCRIPTION

Figure 1:
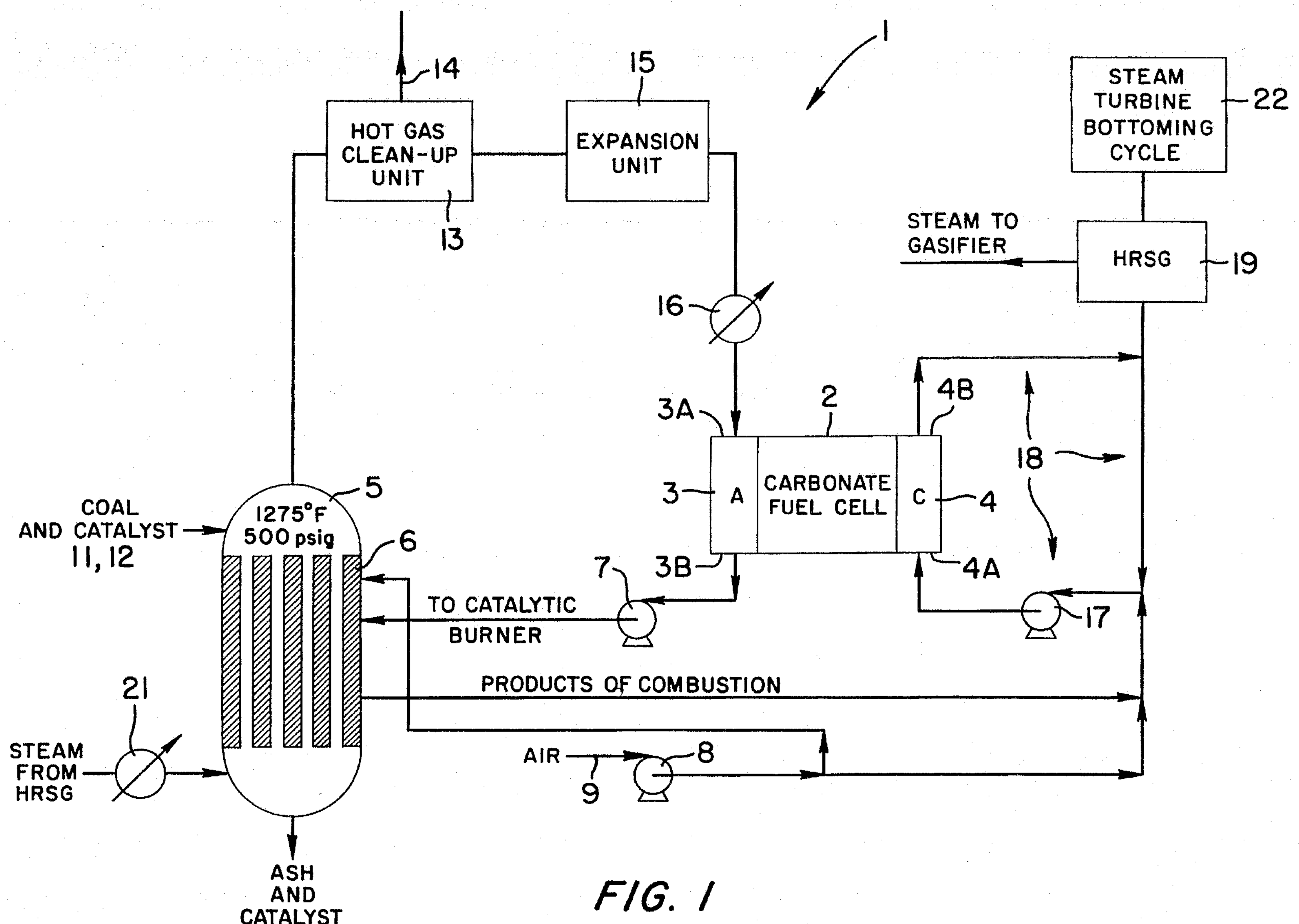
FIG. 1 shows a first embodiment of a fuel cell system in accordance with the principles of the present invention.

FIG. 1 shows a fuel cell system 1 in accordance with a first embodiment of the present invention. As shown, the fuel cell system 1 comprises a high temperature carbonate fuel cell 2 which includes an anode section or compartment 3 and a cathode section or compartment 4.

The anode compartment 3 receives fuel gas at an input port 3A and couples anode exhaust gas to an output port 3B. Likewise, the cathode compartment 4 receives oxidant and other gases at an input port 4A and delivers cathode exhaust gas to an output port 4B.

The fuel gas supplied to the anode input port 3A is derived from the output of a gasifier 5, shown as a catalytic coal gasifier, which is configured and operated in accordance with the principles of the present invention. More particularly, the gasifier 5 is supplied heat for its gasification processing from heat derived from the anode exhaust gas of the fuel cell 2. Furthermore, the gasifier 5 is operated at a relatively low temperature (a representative temperature being 1275°, as shown) which is close to the operating temperature of the fuel cell 2, and at an elevated pressure (a representative pressure being 500 psig, as shown).

In the embodiment of FIG. 1, heat for the gasifier 5 is derived from the anode exhaust gas by burning the exhaust gas with an oxidant gas in a catalytic burner 6 disposed within the gasifier 5 itself. A blower 7 carries the anode exhaust gas from the anode outlet port 3B to the burner 6, while a further blower 8 carries air or oxidant gas to the burner from an oxidant supply 9.

The catalytic burner 6 burns or combusts the received anode exhaust and oxidant gases without admixing them with the gases being generated in the gasifier. This burning is conducted at a relatively low pressure, typically near atmospheric, and at an elevated temperature, resulting in the generation of a significant amount of heat. The generated heat is transferred from the burner to the gasifier 5 by heat exchange to drive the gasification reaction.

Use of the catalytic burner 6 allows the transfer of heat from the low pressure anode exhaust gas to the high pressure gasifier 5 without the need to recompress the anode exhaust gas. It also eliminates the necessity of using oxidant gas in the gasifier to burn coal to generate heat, which if required reduces the heating value of the fuel gas produced.

In the gasifier 5, the gasification reaction driven by the heat from the burner 6 converts the coal supplied to the gasifier 5 from the coal supply 11, into fuel gas containing methane, carbon monoxide, hydrogen, carbon dioxide and water. This process is enhanced by the presence of the catalyst supplied to the gasifier 5 from the catalyst supply 12. Used catalyst and ash from the gasification process are extracted from the gasifier and discarded, while the generated fuel gas is passed on for use by the fuel cell 2.

More particularly, the generated fuel gas is first passed through a hot gas clean-up unit 13 which removes unwanted gases via a regeneration gas stream 14. The clean fuel gas is then expanded or decompressed in an expansion unit 15. The expanded fuel gas is passed through a heating unit 16 and delivered from the latter unit to the anode inlet port 3A at the appropriate temperature and pressure required by the fuel cell 2.

Oxidant for the fuel cell 2 is supplied to the cathode inlet port 4A via a blower 17 which receives a portion of the oxidant gas carried by the blower 8. Also supplied to the cathode inlet port 4A via the blower 17 are the combustion products or gases, which include carbon dioxide, from the burner 6. A portion of the cathode exhaust gas is likewise circulated by the blower 17 from the cathode outlet port 4B to the cathode inlet port 4A to form a cathode gas recycle loop 18.

Within the fuel cell 2, the fuel gas introduced into anode compartment 3 through the anode inlet port 3A is internally reformed. The internally reformed fuel gas and the oxidant and other gases introduced into cathode compartment 4, in the presence of the carbonate electrolyte of the fuel cell 2, then undergo an electrochemical reaction to produce a DC voltage output. The exhaust gas from the anode compartment 3 is then carried, via the blower 7, from the anode outlet port 3B to the catalytic burner 6 in the gasifier 5, as above-described.

The cathode exhaust gas not recycled via the recycle loop 18, is passed to a heat recovery steam generator 19 to produce steam. A portion of this steam is heated in a heating unit 21 and then introduced into the gasifier 5 for use in the gasification reaction. Excess steam is passed to a steam turbine bottoming cycle 22 to produce additional power.

The fuel cell system 1 arranged as above-described with the integration of the gasifier 5 and the internally reforming carbonate fuel cell 2 provides an overall more efficient fuel cell system. More particularly, by utilizing a catalyst in the gasifier 5 to catalyze the gasification reaction, the gasification temperature can be lowered to approximately the fuel cell operating temperature. This reduction in the gasification temperature maximizes the formation of methane in the gasifier, which is an exothermic reaction. The heat produced by the methanation reaction provides additional heat for gasification and makes it possible to conduct the gasification thermo-neutrally, thereby eliminating the need for an oxidant in the gasifier and converting more of the coal to fuel which, in turn, is converted to electricity more efficiently by the fuel cell 2. By conducting the gasification at a temperature close to the operating temperature of the carbonate fuel cell, gas cooling and heat recovery are minimized when using the hot gas clean-up unit 13, thereby contributing further to improved efficiency.

As above-indicated, a hot gas clean-up unit 13 has been used in the system of FIG. 1 to clean the fuel gas produced by the gasifier 5. However, a cold gas clean-up unit could also have been used. In a system using cold gas clean-up, the hot gas clean-up unit 13 would be replaced by a raw gas cooling and scrubbing unit, followed by an acid gas removal unit. The latter unit would then feed the expansion unit 15 which would also provide moisturization to the expanded gas.

For the system 1 of FIG. 1 in which hot gas clean-up is used, the net heat rate has been estimated to be 6465 Btu/kW hr (HHV), corresponding to an efficiency of 52.8% (HHV). If instead of using hot gas clean-up, cold gas clean-up is used, the estimated efficiency is somewhat less at approximately 6640 Btu/kW hr (HHV), corresponding to an efficiency of 51.4% (HHV). These efficiencies are quite favorable as compared to the 49.7% (HHV) efficiencies shown in studies to be expected from conventional fuel cell systems in which standard coal gasifiers and hot gas clean-up are used. Moreover, as compared to non-fuel cell coal based systems, whose efficiencies have been reported at around 40.5% (HHV) for an Integrated Gasification Combined Cycle (IGCC), the system 1 offers almost a 30% improvement in efficiency.

Another advantage of the fuel cell system 1 is that unwanted emissions of $SO_x$, $NO_x$ and $CO_2$ are all significantly lower than those found in competing non-fuel cell systems. Carbon dioxide emissions are lower as compared to conventional fuel cell systems with coal gasification, due to the efficiency improvement.

Figure 2:
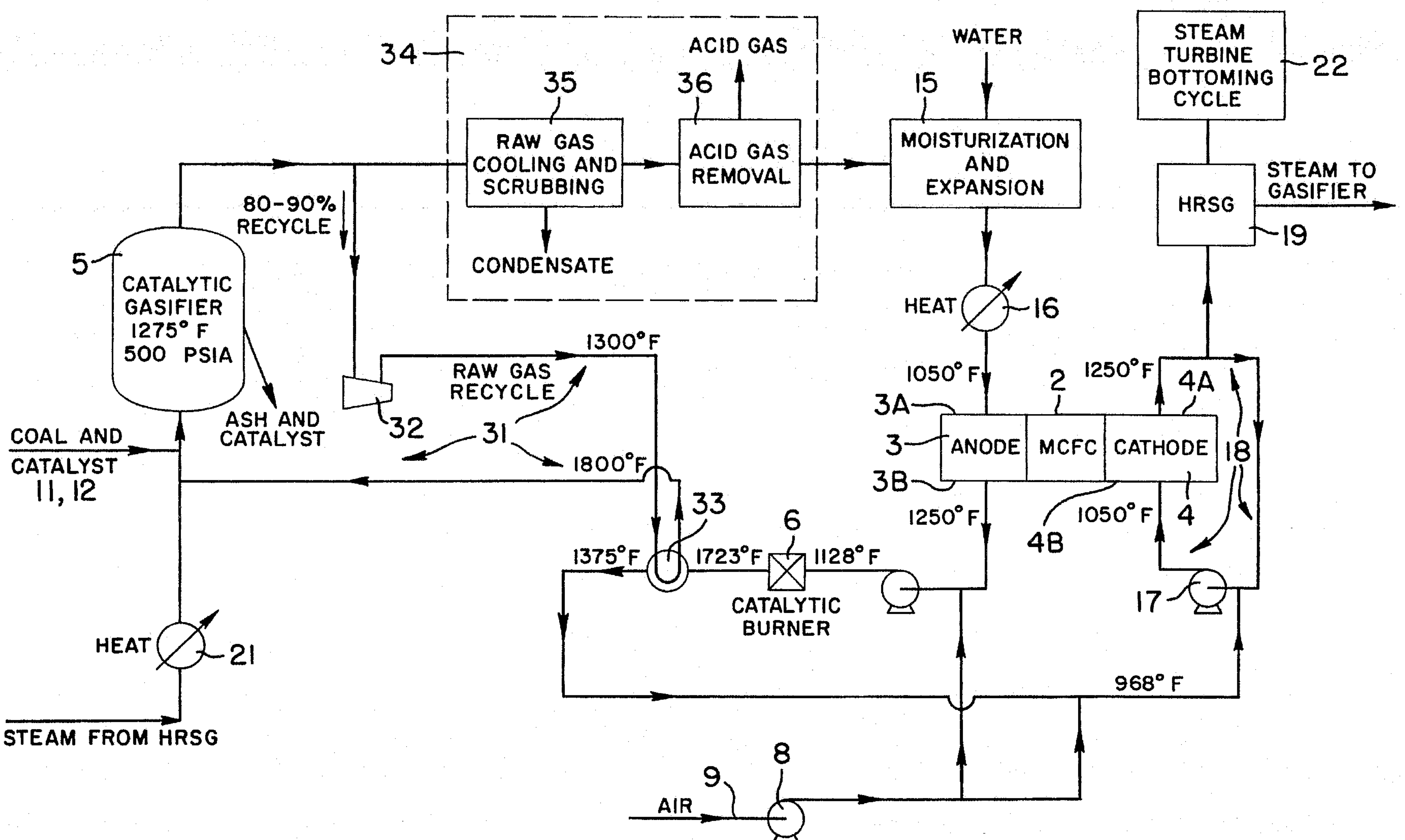
FIG. 2 shows a second embodiment of a fuel cell system in accordance with the principles.

FIG. 2 illustrates a modified embodiment of the fuel cell system 1 of FIG. 1 in which the burner 6 has been situated externally of the gasifier 5 and transfers heat to the gasifier via heat exchange with gas being recycled back to the gasifier. In this embodiment, a substantial portion (shown as 80 to 90 percent) of the fuel gas output of the gasifier 5 is recirculated back to the gasifier by a blower 32 in a gasifier recycle loop 31.

The recycle loop 31 carries the recycled fuel gas through a heat exchanger 33 which receives the hot combusted gas from the catalytic burner 6. In the heat exchanger 33, the heat from the combusted gas is transferred by heat exchange to the recycled fuel gas without admixing of the gases. The recycled gas is thus heated and its heat imparted to the gasifier 5 to heat the gasifier reaction.

The system of FIG. 2 is illustrated with a cold gas clean-up unit 34. This unit includes a cooling and scrubbing unit 35 and an acid gas removal unit 36. The unit 34 feeds the expansion unit 15 which also provides moisturization to the expanded gas.

The system of FIG. 2 eliminates the need to place the catalytic burner 6 within the gasifier 5. It also provides more intimate heat transfer to the fuel gases of the gasifier. Moreover, while the system of FIG. 2 has been illustrated with a cold gas clean-up unit, a hot gas clean-up as in the system of FIG. 1 could also have been used.

In the embodiments of the invention shown in FIGS. 1 and 2, the gasifier 5 was illustrated as a catalytic coal gasifier. However, any other type of gasifier can also be employed in each of these embodiments. A particular other type of gasifier might be a biomass gasifier.

In a biomass gasifier biomass such as wood, agricultural crops and residues, municipal solid wastes, industrial wastes such as paper mill and food industry wastes, can be used as the input feedstock, instead of coal as used in a coal gasifier. In this case, some of these feedstocks will be naturally catalyzed due to their potassium and other mineral content, and the gasification process will be substantially identical to the coal gasification process.

Thermal integration with the fuel cell of the biomass gasifier to drive the endothermic gasification reaction in the gasifier, will parallel that shown in FIGS. 1 and 2 for the catalytic coal gasifier. Variations in the gas compositions produced by the biomass gasifier compared to the catalyzed coal gasifier will not have a major impact on fuel cell operation.

Variations in fuel cell performance using a biomass gasifier as compared to a coal gasifier will generally be proportional to the Btu content of the fuel gas. Fuel gas cleanup will be similar with possible variations to address specific trace components in the fuel gas produced.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A fuel cell system comprising:

a fuel cell having an anode compartment and a cathode compartment for receiving fuel gas and oxidant gas, respectively;

a gasifier for generating fuel gas for said fuel cell;

and a catalytic burner means which receives the exhaust gas from said anode compartment of said fuel cell and which burns said anode exhaust gas and an oxidant gas to generate and directly transfer heat to gases generated by said gasifier without said exhaust gases admiring with the gases generated by said gasifier.

2. A fuel cell in accordance with claim 1, wherein:

said gasifier is one of a catalytic coal gasifier and a biomass gasifier.

3. A fuel cell system in accordance with claim 2 wherein:

said catalytic burner means comprises a catalytic burner disposed within said gasifier.

4. A fuel cell system in accordance with claim 3, wherein:

said fuel cell is a carbonate fuel cell.

5. A fuel cell system in accordance with claim 4, wherein:

said fuel cell is an internally reforming carbonate fuel cell.

6. A fuel cell system in accordance with claim 2, wherein:

said catalytic burner means is disposed externally of said gasifier.

7. A fuel cell system in accordance with claim 6 further comprising:

a recycle loop external of said gasifier for recycling a portion of the output gas of said gasifier back to the input of said gasifier;

and said catalytic burner means includes a catalytic burner and a heat exchanger in communication with said catalytic burner which transfer said heat to said recycled portion of said output gas of said gasifier.

8. A fuel cell system in accordance with claim 7, wherein said recycled portion of the output gas of said gasifier is between 80 to 90 percent of said output gas of said gasifier.

9. A fuel cell system in accordance with claim 7, wherein:

said fuel cell is a carbonate fuel cell.

10. A fuel cell system in accordance with claim 9, wherein:

said fuel cell is an internally reforming carbonate fuel cell.

11. A fuel cell system in accordance with claim 6, wherein:

said fuel cell is a carbonate fuel cell.

12. A fuel cell system in accordance with claim 11, wherein:

said fuel cell is an internally reforming carbonate fuel cell.

13. A fuel cell system in accordance with claim 2, wherein:

said gasifier is operated at low temperature and high pressure.

14. A fuel cell system in accordance with claim 13, wherein:

said catalytic burner is operated at high temperature and low pressure.

15. A fuel cell system in accordance with claim 14, wherein:

said gasifier is operated at a temperature in the range of 1200° to 1400° F. and a pressure in the range of 300 to 700 psig;

and said catalytic burner is operated at a temperature in the range of 1600°–1800° F. and a pressure in the range of 0 to 15 psig.

16. A fuel cell system in accordance with claim 14, wherein:

said fuel cell is a carbonate fuel cell.

17. A fuel cell system in accordance with claim 16, wherein:

said fuel cell is an internally reforming carbonate fuel cell.

18. A fuel cell system in accordance with claim 13, wherein:

the operating temperature of said gasifier differs from the operating temperature of said fuel cell by less than 200° F.

19. A fuel cell system in accordance with claim 13, wherein:

said fuel cell is a carbonate fuel cell.

20. A fuel cell system in accordance with claim 19, wherein:

said fuel cell is an internally reforming carbonate fuel cell.

21. A method for generating fuel gas to be received in the anode compartment of a fuel cell whose cathode compartment is to receive oxidant gas, the method comprising:

gasifying a material to generate fuel gas for said anode compartment of said fuel cell; and catalytically burning the exhaust gas from the anode compartment of said fuel cell with an oxidant gas to generate heat and directly transferring said heat to said gasification step without said anode exhaust gas admixing with the gases generated in said gasification step.

22. A method in accordance with claim 21, wherein:

said gasification step includes one of catalytic coal gasification and biomass gasification.

23. A method in accordance with claim 22, wherein:

said catalytic burning occurs within the gasifier in which said gasification occurs.

24. A method in accordance with claim 23, wherein:

said fuel cell is a carbonate fuel cell.

25. A method in accordance with claim 24, wherein said fuel cell is an internally reforming carbonate fuel cell.

26. A method in accordance with claim 22, wherein:

said catalytic burning occurs external to the gasifier in which said gasification occurs.

27. A method in accordance with claim 26, further comprising:

recycling a portion of the gas generated in said gasification step back to said gasification step;

and said step of transferring and generating said heat includes transferring said heat to said recycled portion of said gas generated in said gasification step.

28. A method in accordance with claim 27, wherein:

said recycled portion of the gas generated in said gasification step is in the range of 80 to 90 percent of said gas.

29. A method in accordance with claim 27, wherein:

said fuel cell is a carbonate fuel cell.

30. A method in accordance with claim 29, wherein:

said fuel cell is an internally reforming carbonate fuel cell.

31. A method in accordance with claim 26, wherein:

said fuel cell is a carbonate fuel cell.

32. A method in accordance with claim 31, wherein:

said fuel cell is an internally reforming carbonate fuel cell.

33. A method in accordance with claim 22, wherein:

said gasification step is conducted at low temperature and high pressure.

34. A method in accordance with claim 33, wherein:

said catalytic burning step is conducted at high temperature and low pressure.

35. A method in accordance with claim 34, wherein:

said gasification step is carried out at a temperature in the range of 1200° to 1400° F. and a pressure in the range of 300–700 psig;

and said catalytic burning step is carried out at a temperature in the range of 1600° to 1800° F. and a pressure in the range of 0–15 psig.

36. A method in accordance with claim 34, wherein:

said fuel cell is a carbonate fuel cell.

37. A method in accordance with claim 36, wherein:

said fuel cell is an internally reforming molten carbonate fuel cell.

38. A fuel cell system in accordance with claim 21, wherein:

the operating temperature of said gasification step differs from the operating temperature of said fuel cell by less than 200° F.

39. A method in accordance with claim 21, wherein:

said fuel cell is a carbonate fuel cell.

40. A method in accordance with claim 39, wherein:

said fuel cell is an internally reforming carbonate fuel cell.

41. Apparatus for use in a fuel cell system including a fuel cell having an anode compartment and a cathode compartment for receiving fuel gas and oxidant gas, respectively, said apparatus comprising:

a gasifier for generating fuel gas for said fuel cell;

and a catalytic burner disposed within said gasifier, said catalytic burner receiving exhaust gas from said anode compartment of said fuel cell burning said anode exhaust gas and an oxidant gas to generate and directed transfer heat to gases generated by said gasifier without said anode exhaust gas admixing with the gases generated by said gasifier.

42. An apparatus in accordance with claim 41, wherein said gasifier is one of a catalytic coal gasifier and a biomass gasifier.

43. Apparatus in accordance with claim 42, wherein:

said fuel cell is a carbonate fuel cell.

44. Apparatus in accordance with claim 43, wherein:

said fuel cell is an internally reforming carbonate fuel cell.

* * * * *

UNITED STATES PATENT AND TRADEMARK OFFICE
CERTIFICATE OF CORRECTION

PATENT NO. : 5,554,453

DATED : September 10, 1996

INVENTOR(S) : George Steinfeld, et al.

It is certified that error appears in the above-identified patent and that said Letters Patent is hereby corrected as shown below:

Col. 5, line 36, change "admiring" to -- admixing --.

Col. 8, line 21, change "directed" to -- directly --.

Signed and Sealed this

Eighteenth Day of March, 1997

Attest:

BRUCE LEHMAN

*Attesting Officer*

*Commissioner of Patents and Trademarks*